United States Patent
Reber

(10) Patent No.: US 8,290,749 B2
(45) Date of Patent: Oct. 16, 2012

(54) SIGNAL-PROCESSING METHOD FOR USE IN A FORCE-MEASURING DEVICE AND FORCE-MEASURING DEVICE

(75) Inventor: Daniel Reber, Madetswil (CH)

(73) Assignee: Mettler-Toledo AG, Greifensee (CH)

( * ) Notice: Subject to any disclaimer, the term of this patent is extended or adjusted under 35 U.S.C. 154(b) by 680 days.

(21) Appl. No.: 12/490,459

(22) Filed: Jun. 24, 2009

(65) Prior Publication Data

US 2009/0319201 A1 Dec. 24, 2009

(30) Foreign Application Priority Data

Jun. 24, 2008 (EP) ..................... 08158881

(51) Int. Cl.
  *G01D 5/00* (2006.01)
  *G01L 1/00* (2006.01)
  *G01G 19/34* (2006.01)
(52) U.S. Cl. ............ 702/189; 702/41; 702/173; 73/763; 177/25.13
(58) Field of Classification Search ............ 702/41, 702/173, 189; 73/763; 177/25.13
See application file for complete search history.

(56) References Cited

U.S. PATENT DOCUMENTS

| 3,826,319 A | 7/1974 | Loshbough |
| 4,153,122 A | 5/1979 | Engels et al. |
| 4,344,494 A | 8/1982 | Knothe et al. |
| 5,419,204 A * | 5/1995 | Yamaguchi et al. ....... 73/862.61 |
| 5,559,899 A * | 9/1996 | Schmidt ..................... 382/224 |
| 7,395,183 B2 | 7/2008 | Hamamoto |

FOREIGN PATENT DOCUMENTS

JP 59-159027 A 9/1984

* cited by examiner

*Primary Examiner* — Andrew Schechter
*Assistant Examiner* — L. Anderson
(74) *Attorney, Agent, or Firm* — Standley Law Group LLP

(57) ABSTRACT

A method, an arrangement and a program process a measurement signal generated in a measurement transducer of an electronic force-measuring device, particularly a balance. The generated measurement signal corresponds to the force acting on the transducer. The measurement signal is entered directly or by way of a pre-processing stage into a display function which assigns corresponding output values to the values of the measurement signal. The output values are subsequently presented in a display or passed on for further processing. The input range of the display function contains a capture range, so that the values of the measurement signal that lie within the capture range are assigned a common output value by the display function, and the position of the capture range within the input range is controlled dependent on the generated measurement signal.

16 Claims, 4 Drawing Sheets

SIGNAL-PROCESSING METHOD FOR USE IN A FORCE-MEASURING DEVICE AND FORCE-MEASURING DEVICE

CROSS-REFERENCE TO RELATED APPLICATIONS

This application claims a right of priority under 35 USC §119 from European patent application 08 15 8881.6, filed 24 Jun. 2008, the content of which is incorporated by reference as if fully recited herein.

TECHNICAL FIELD

The disclosed embodiments concern a signal-processing method for use in a force-measuring device, specifically in a balance, and a force-measuring device that is suitable to carry out the method.

BACKGROUND OF THE ART

A frequently used type of electronic force-measuring device includes a mechanical/electrical measurement transducer which converts the force acting on the force-measuring device into a corresponding electrical measurement signal. Analogously, the measurement conversion in a balance generates an electrical measurement signal which corresponds to the weight force exerted by the weighing object. Following the conversion, the measurement signal is transmitted to a display or to a further processing device, for example a master computer or a system controller.

Before the electrical measurement signal is displayed or processed further, it is in most cases sent to a signal-processing stage which is arranged as a pre-processing unit in the signal path ahead of the display and/or the further processing section. In this pre-processing stage, the measurement signal is processed, evaluated and in some cases corrected and amplified.

To make the measurement signal compatible with the display or a further processing stage, it is normally converted into a suitable format. For example in the case of an analog indicator, the voltage values of the measurement signal are adapted to the range that can be represented on the display or, in the case of a digital indicator, corresponding digital output values are assigned to the measurement signal.

The conversion can generally be described by a display function which assigns corresponding output values to the input values. The values of the measurement signal represent the input values of the display function, and the output values of the display function are presented on the display or passed along for further processing. The conversion of the measurement signal into digital output values can be described for example by a display function with a step-shaped characteristic, to that discrete output values are assigned to the continuous input values.

Force-measuring devices, specifically balances, are typically used to weigh individual objects, and also in automated production- and test systems for the weighing of larger quantities of goods. A force-measuring device of this kind has to meet the requirements of a high measuring accuracy and high reproducibility of the measurements and thus a high degree of stability. The force-measuring device should further be of a simple and cost-effective design.

Particularly in applications where the measurement accuracy is high, it is known that even the smallest disturbances of the measurement signal can lead to considerable instabilities of the output values. These instabilities cause frequent, rapid changes of the values presented in the display, i.e. so-called display fluctuations. As a result of the display fluctuations, it becomes difficult or even impossible to read these values, in particular their lowest decimal places or finest scale graduations. As a further consequence, these instabilities can cause problems such as inaccuracies downstream in the processing.

The existing state of the art offers a variety of methods to solve these problems. For example in U.S. Pat. No. 3,826,319, a balance with a digital display is disclosed where after a change of the weighing load the lowest decimals are suppressed and are subsequently restored one by one in the display. However, suppressing the display digits causes a loss of accuracy, so that this method is not suitable when a high accuracy is required.

Losses of accuracy can be avoided to a certain extent through processing methods in which a stabilization of the display is achieved by averaging the measurement signal. However, the averaging process will cause a deterioration of the response of the force-measuring device to load changes, i.e. the ability of the display to follow the input signal is slowed down and the time required for a measurement is increased.

The existing state of the art offers a variety of methods to shorten the response time regardless of the averaging. For example DE 102005021547 discloses the concept of temporarily interrupting the averaging process during a change of the weighing load in order to be able to follow the load changes more rapidly. However, this method requires a relatively elaborate circuit design.

An unmet objective of the prior art is to provide a method of processing the signal of a force-measuring device, specifically a balance, and to further provide a force-measuring device that is suitable to carry out the method and satisfies exacting requirements in regard to measurement accuracy, stability and response time as well as in regard to simplicity and cost-effectiveness in its design and operation.

SUMMARY

This objective is met by a signal-processing method, a suitable force-measuring device and a computer program with the features described in the independent claims. Advantageous embodiments are presented in the additional, dependent claims.

The disclosure herein concerns a method, a device and a computer program for processing the signal in an electronic force-measuring device, specifically a balance, with a measurement transducer generating a measurement signal corresponding to a force acting on the transducer, wherein the measurement signal is entered directly or by way of a pre-processing stage into a display function which assigns corresponding output values to the values of the measurement signal and wherein said output values are subsequently presented in a display or passed on for further processing. The input range of the display function contains a capture range, so that the values of the measurement signal that lie within the capture range are assigned a common output value by the display function, and the position of the capture range within the input range is controlled dependent on the measurement signal. The influence of disturbances can thereby be effectively suppressed, and fluctuations of the display can be avoided without compromising the measurement accuracy, the stability or the response time of the force-measuring device.

Surprisingly, a stable display indication can be achieved even under difficult conditions, particularly in the presence of low-frequency disturbances. While high-frequency interference and oscillations can be filtered with state-of-the-art methods in a relatively simple manner, the method provides the possibility to suppress low-frequency disturbances and oscillations. The term "low-frequency disturbances and oscillations" should be understood in relation to the typical length of time for a measurement. If a measurement takes for example from one to a few seconds, low-frequency oscillations can typically have a period of a few seconds up to a few minutes.

The advantages gained by the embodiments manifest themselves in particular with a digital display, but the embodiments can also be used with an analog display. Due to this universal applicability, the disclosed embodiments offer cost advantages as well as advantages regarding stability and operation in very diverse types of force-measuring devices.

The capture range is characterized by the fact that for the values of the measurement signal that lie in the capture range, a common output value is assigned. In the mathematical sense, this represents a surjective mapping of the set of values of the capture range onto a target set with one element, i.e. the common output value, so that the latter is independent of the individual values of the measurement signal as long as those values lie within the capture range.

Due to this characteristic, very robust and stable output values are obtained with an appropriate choice of the size of the capture range. The result is a significant improvement over the state-of-the-art methods of averaging which always lead to a certain amount of fluctuation in the output values which is caused by the input of new measurement values into the calculation.

The display function is realized preferably with a display processing unit. The output of the latter is designed for connection to a display unit and/or to a further processing unit, so that the output values determined by means of the display function can be passed along to one or both of these units. The term "display processing unit" as used herein includes all signal-processing elements such as circuits, analog circuits, analog/digital converters, integrated circuits, operational amplifiers, shift registers, processors, computers, arithmetic units and the like.

In a preferred embodiment, the common output value is predetermined, specifically in regard to a predetermined starting value and/or the time profile of the measurement signal during an earlier time interval. As a result, short-term fluctuations of the measurement result and, consequently, momentary fluctuations of the display indication, can be effectively suppressed.

In an advantageous embodiment, the capture range is delimited against the input range by a first boundary and a second boundary, and in the control of the capture range the distance between the boundaries is kept essentially constant. The control of the capture range can thereby be reduced to the control of one parameter, i.e. the control of a single position parameter, whereby a particularly simple kind of control can be achieved.

In a further advantageous embodiment, the capture range is wider than the expected fluctuations of the measurement signal and/or wider than the resolution of the display and/or wider than the processing accuracy of the further processing stage. The capture range is preferably larger than twice the amount, and even more preferably three or four times the amount, of the variance of the measurement signal. As a result of this, fluctuations in the display can be reduced to a minimum, or their occurrence can be restricted to very low levels of probability.

In a further embodiment, a characteristic value is assigned to the capture range, in particular a center-point value of the capture range, which characterizes the position of the capture range and which can be controlled dependent on the measurement signal. With this concept, the control of the capture range can be realized in a simple way based on the characteristic value.

In a further embodiment, the capture range is controlled in a stepwise mode, in particular with a constant step size corresponding to a first correction parameter. As a result, the display values are not changed continuously, but only at certain points in time, whereby short-term display fluctuations are effectively avoided.

In a preferred embodiment, a value is formed which corresponds to the measurement signal, this value is compared to a threshold value and dependent on the result of the comparison, the position-setting of the capture range is triggered. As a result, a stepwise change of the capture range is achieved which progresses at a substantially even rate. Further, the display is able to follow changes of the load in an appropriate manner, while disturbances whose integral values remain below the threshold value are effectively suppressed.

In a further preferred embodiment, a value is established for the difference between the measurement signal and the output value and is integrated to obtain an integral value based on which the position of the capture range is controlled. Since the integral value changes likewise at a correspondingly fast rate in response to large changes of the measurement signal, a short reaction time of the force-measuring device in response to changes of the weighing load can be achieved in spite of the high level of accuracy.

In a further embodiment, the integral value is changed in a stepwise mode, in particular with a constant step size according to a second correction parameter which corresponds to position changes of the capture range. With this stepwise adaptation, a continuous accumulation of the integrator can be adapted in a simple way in accordance with the new situation.

In a particularly preferred embodiment, the integral value is changed in such a way that the amount of the changed integral value is larger than zero. Thus, the integrator is never set completely back to zero, but a certain information content or signal portion from the preceding integration is always preserved. This manifests itself in the fact that changes of the display indication will reverse their direction only after a major change of the measurement signal. For example after the measurement signal has exceeded the positive threshold value, the values of the measurement signal will first have to pass through the entire capture range until they reach the negative threshold value.

This characteristic leads to a so-called hysteresis effect in that each output value inherently contains a certain amount of past history and, accordingly, the output value always depends on the direction in which the output value was arrived at. With this hysteresis effect, short-term fluctuations can be further reduced and, accordingly, a very solid display can be achieved.

With a suitable choice of the correction parameter and thus of the step size of the changes of the integral value the robustness, i.e. the ability to resist fluctuations, of the display can be improved significantly, for example by a factor of three, without causing a delay in the response.

A preferred embodiment further includes a program which can be executed in a signal-processing unit, in particular a display-processing unit or an arithmetic unit, and which serves to calculate an output value according to the method. This allows a very high degree of flexibility and the incorporation of further functional capabilities in the signal-processing stage to be achieved.

In a further embodiment, the position of the capture range is controlled in essence simultaneously with an adaptation of the integral value. This has the effect that the integration can immediately be continued, whereby a fast response of the force-measuring device can be achieved.

In a further embodiment, the integrator generates an integral value corresponding to a positive difference and an integral value corresponding to a negative difference. Based on these integral values, the position of the capture range is controlled, specifically for changes in the respective opposite directions. This allows the integration to be performed in a simple way.

Preferably, an ancillary quantity with the opposite sign of the measurement values of the measurement signal is integrated by the integrator. The robustness of the integration can thereby be additionally improved.

A measurement signal which is present typically in analog form is preferably converted by means of an analog/digital conversion into digital values, which are directed to the display function as digital input values. The digital values correspond to the analog measurement signal and thus to the force which is acting on the force-measuring device. The output values generated by the display function will normally be presented likewise as digital information, for example as numeric values.

BRIEF DESCRIPTION OF THE DRAWINGS

Details of the force-measuring device, the force-measuring module and the method will be apparent from the description of the embodiments that are illustrated in the drawings, wherein.

DETAILED DESCRIPTION

Figure 1:
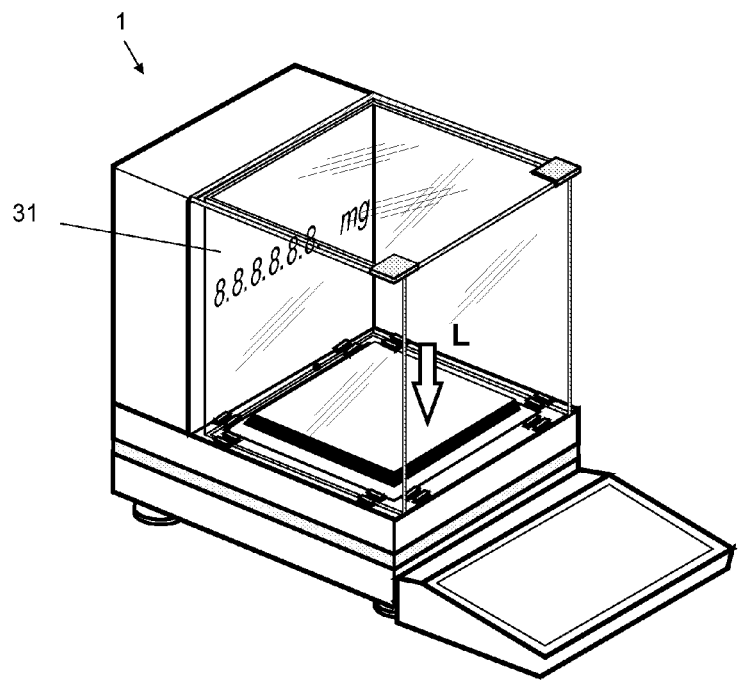
FIG. 1 is a perspective view of a balance in an exemplary embodiment with a symbolically represented load L and an indicator unit.

FIG. 1 is a perspective view of a balance 1 with an indicator unit 31 in an exemplary embodiment wherein the action of a load L is symbolically indicated. The balance 1 is equipped with a display-processing unit (not shown in FIG. 1) which has the task to attain an accurate and stable output value A of the indicator unit 31, wherein the latter can for example consist of a digital liquid crystal display.

Figure 2:
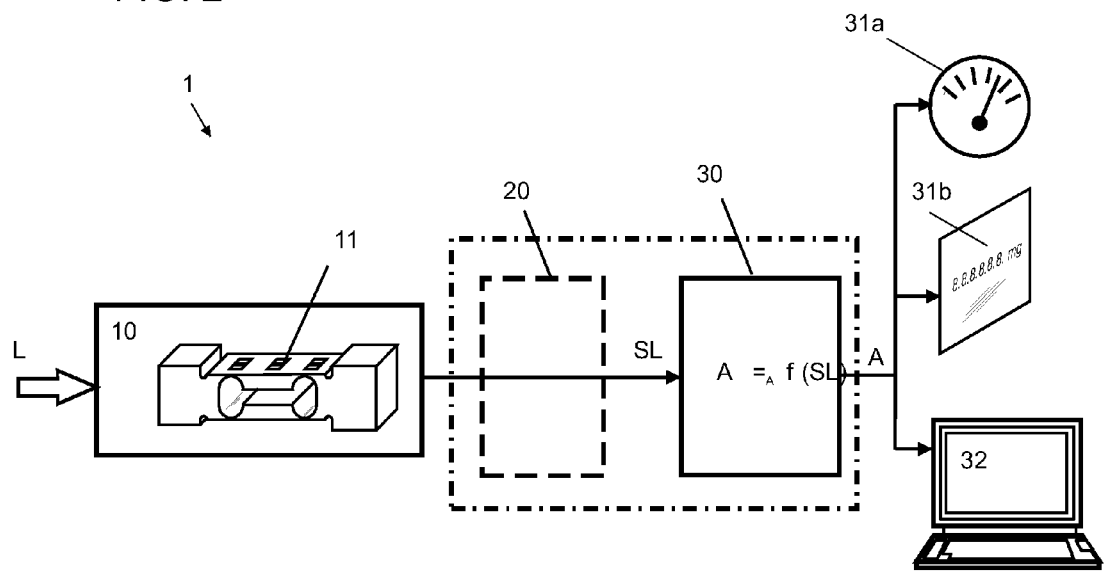
FIG. 2 is a block diagram of the FIG. 1 balance, with a measurement converter connected to a display-processing unit, so that by means of a display function $F_A(SL)$ an output value A is calculated and passed on to an analog indicator unit, a digital indicator unit and a further processing unit.

FIG. 2 shows the block diagram of the balance 1 of FIG. 1 in an exemplary illustration. The measurement transducer 10, whose operating principle is in this example based on the deformation of strain gauges 11, generates a measurement signal which corresponds to the force L acting on the measurement transducer. The measurement transducer 10 is connected to a display-processing unit 30, either directly or through a pre-processing unit 20 (as shown in FIG. 2) in order to transmit the measurement signal SL to the display-processing unit 30. As indicated in FIG. 2, the display-processing unit 30 can also be incorporated in the pre-processing unit 20, for example as a shared circuit, as a part of an arithmetic program in a microprocessor, or as a subassembly. However, the pre-processing unit 20 or the pre-processing functions could also be taken over by the measurement transducer 10, in which case the measurement signal generated by the measurement transducer would not require further pre-processing.

The range of measurement transducers 10 encompassed here includes the most diverse types, for example measurement transducers based on the principle of magnetic force compensation, or measurement transducers that are based in a general sense on the deformation of deformable bodies, for example so-called rocker pin load cells.

In the display-processing unit 30 the received measurement signal SL is processed into output values A. The output of the display-processing unit 30 is connected to an indicator unit 31, for example a digital liquid crystal display 31a or an analog dial instrument 31b, so that the output values A can be passed on to the indicator unit and displayed. The output values A can also be sent to a further processing unit 32, for example a monitoring- and/or alarm device and/or a master computer and/or a process controller.

In the display-processing unit 30, the values of the measurement signal SL are directed as input values to a display function $F_A$. By means of this display function $F_A$, corresponding output values A are assigned to the values of the measurement signal SL. This operation can be represented in a general way as display function $F_A$ which describes the relationship of the output value A to the measurement signal SL:

$$A = F_A(SL). \qquad \text{i.}$$

Figure 3:
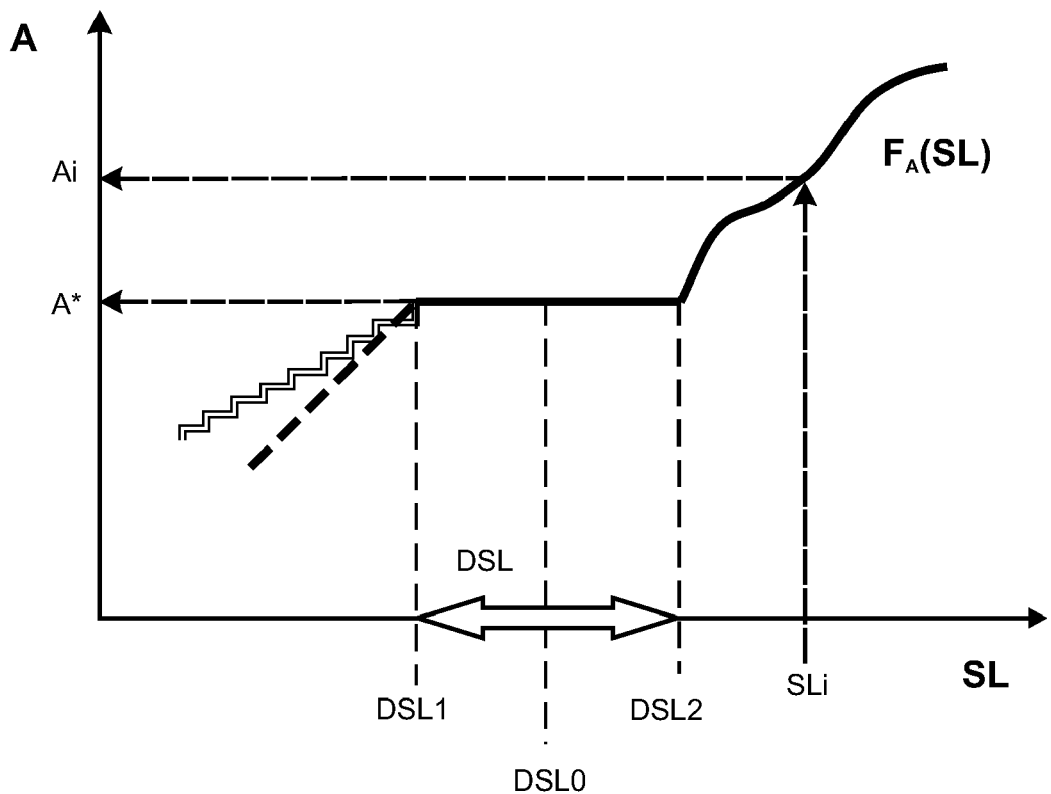
FIG. 3 is an exemplary graph of a display function $F_A(SL)$ as in FIG. 2, which assigns those values of the measurement signal SL which lie in the input range to an output value A, with a capture range DSL which assigns the values of the measurement signal SL to a common output value A*.

FIG. 3 represents in an exemplary illustration the graph of a display function $F_A(SL)$ according to FIG. 2. The range of the input values, the so-called input range of the display function $F_A(SL)$ is represented by the abscissa, and the range of the output values is represented by the ordinate axis. The display function $F_A(SLi)$ assigns to a general input value SLi generated by the measurement signal SL a corresponding general output value Ai. The values of the measurement signal SL lie normally in the input range of the display function $F_A(SL)$. Thus, the input range of the display function $F_A(SL)$ is the range of those input values to which at least one output value A can be assigned.

According to the disclosed embodiments, the input value of the display function $F_A(SL)$ includes a capture range DSL. This capture range DSL is characterized by the fact that the graph of the display function $F_A(SL)$ in this range has the form of a straight line parallel to the abscissa. This means that a common output value A* is assigned by the display function $F_A(SL)$ to all values of the measurement signal SL that lie within the capture range DSL. Accordingly, there is no one-to-one relationship between input values and output values. Rather, an entire range of input values is mapped onto a single common output value A*.

Outside of the capture range DSL, the correlation characteristic of the display function $F_A(SL)$ which is represented by the graph can be given any desired form, for example a monotonically ascending function (solid line), an ascending linear function (broken line), or a step function (double line). A functional correlation in the form of uniform steps of high resolution, so-called quantization or discretization steps, is a commonly used concept in the field of digital technology.

The capture range DSL further has a first boundary DSL1 and a second boundary DSL2 which delimit the capture range DSL against the part of the input range of the display function $F_A(SL)$ that lies outside.

In FIG. 3, a characteristic value DSL0 is marked as a special value. The common output value A* is also assigned to this characteristic value DSL0 by the display function $F_A(SL)$. The characteristic value characterizes in a particular way the position of the capture range DSL within the input range. Typically, the characteristic value DSL0 is the value in the middle of the capture range DSL, i.e. the value represented by the half-way point between the first boundary DSL1 and a second boundary DSL2. However, the characteristic value DSL0 could also characterize the position of the capture range in a different way, for example as the median value or the value with the highest probability of occurrence of the measurement signal SL.

Figure 4:
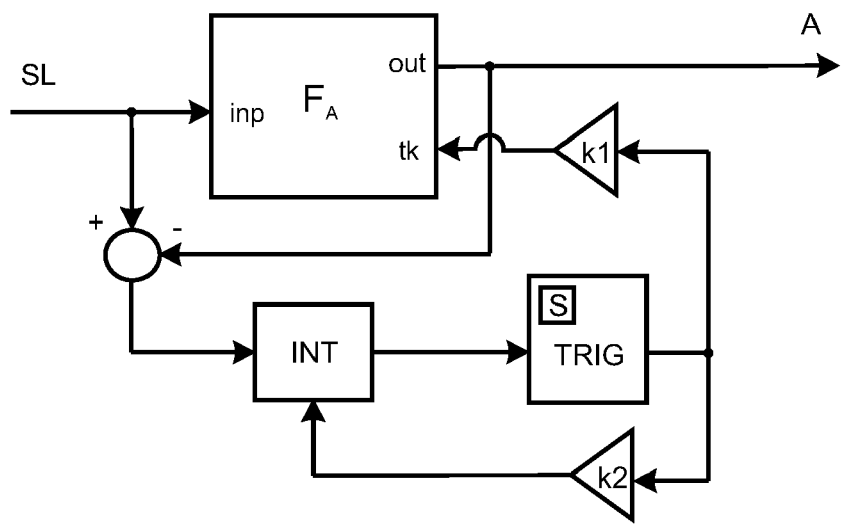
FIG. 4 is a block diagram of a controller unit for a display-processing unit as in FIG. 2, with the display function $F_A(SL)$, an integrator INT and a trigger TRIG which feeds back correction values k1, k2.

FIG. 4 represents an example of a block diagram of a controller unit for a display-processing unit 30 of FIG. 2. The measurement signal SL is sent to the input (inp) of a function block $F_a$ representing the display function $F_A(SL)$. At the output (out) of the function block the output value A is available for example to be presented in the display or to be passed along for further processing. The mode of operation of the function block $F_A$ can be expressed by the following mathematical relationships. In this example, the quantity h stands for one-half of the capture range DSL. At the beginning of the process, the characteristic value DSL0 can represent a starting value and take on for example a value of zero (DSL=0). In the course of the measurements, the characteristic value DSL0 is subsequently changed in the way described in the following paragraphs:

$$A^*=SL-h, \text{ if } SL>DSL0+h;$$  ii.

$$A^*=DSL0, \text{ if } DSL0-h \leq SL \leq DSL0+h;$$  iii.

$$A^*=SL+h, \text{ if } SL<DSL0-h.$$  iv.

These equations describe in essence the shape of the display function $F_A(SL)$ and in particular the capture range of the display function in accordance with FIG. 3.

For the control of the position of the capture range DSL, a further circuit is added to the function block $F_A$. In this modification, the input of the function block $F_A$ and the output of the function block $F_A$ are connected to the inputs of a difference calculator. Accordingly, the difference calculator determines the difference between the measurement signal SL and the output value A. The output of the difference calculator is connected to an integrator INT in order to deliver the difference signal of the difference calculator to the integrator INT.

The output of the integrator INT is connected to the input of a trigger TRIG, so that the value I of the integral can be passed on to the trigger TRIG. In the trigger TRIG, the value I of the integral is compared to a predefined threshold value S. When the threshold value S is exceeded, a trigger signal is generated in the trigger TRIG. The output of the trigger TRIG is connected to the input of a first operational amplifier as well as to the input of a second operational amplifier, so that the trigger signals generated by the trigger TRIG can be passed on to these operational amplifiers.

In the first operational amplifier, the trigger signal is adjusted with a first correction parameter k1, for example multiplied or amplified, and sent to the function block $F_A$ by way of a connector lead which connects the output of the first operational amplifier to a further input tk of the function block $F_A$. The trigger signal which has been adjusted with the correction parameter k1 causes in the function block $F_A$ a shift of the capture range DSL and accordingly a shift of the boundaries and the characteristic value DSL0 of the capture range by the value of the correction parameter k1 in accordance with the following reassignment of values:

$$DSL1 \rightarrow DSL1+k1;$$  v.

$$DSL2 \rightarrow DSL2+k1;$$  vi.

$$DSL0 \rightarrow DSL0+k1;$$  vii.

$$A^* \rightarrow A^*+k1.$$  viii.

In the second operational amplifier the trigger signal is adjusted with a second correction parameter k2 and directed to the integrator INT by way of a connector lead which connects the output of the second operational amplifier with a second input of the integrator. In the integrator INT, the trigger signal which has been adjusted with the correction parameter k2 causes a change of the value I of the integral by the value of the correction parameter K2 in accordance with the following value reassignment:

$$I \rightarrow I-k2.$$  ix.

The shift of the capture range DSL and the change of the value I of the integral occur simultaneously as both operations are initiated by the trigger signal. As a result, changes of the measurement signal can be followed rapidly, and the system performs well in suppressing fluctuations of the measurement signal SL.

Figure 5:
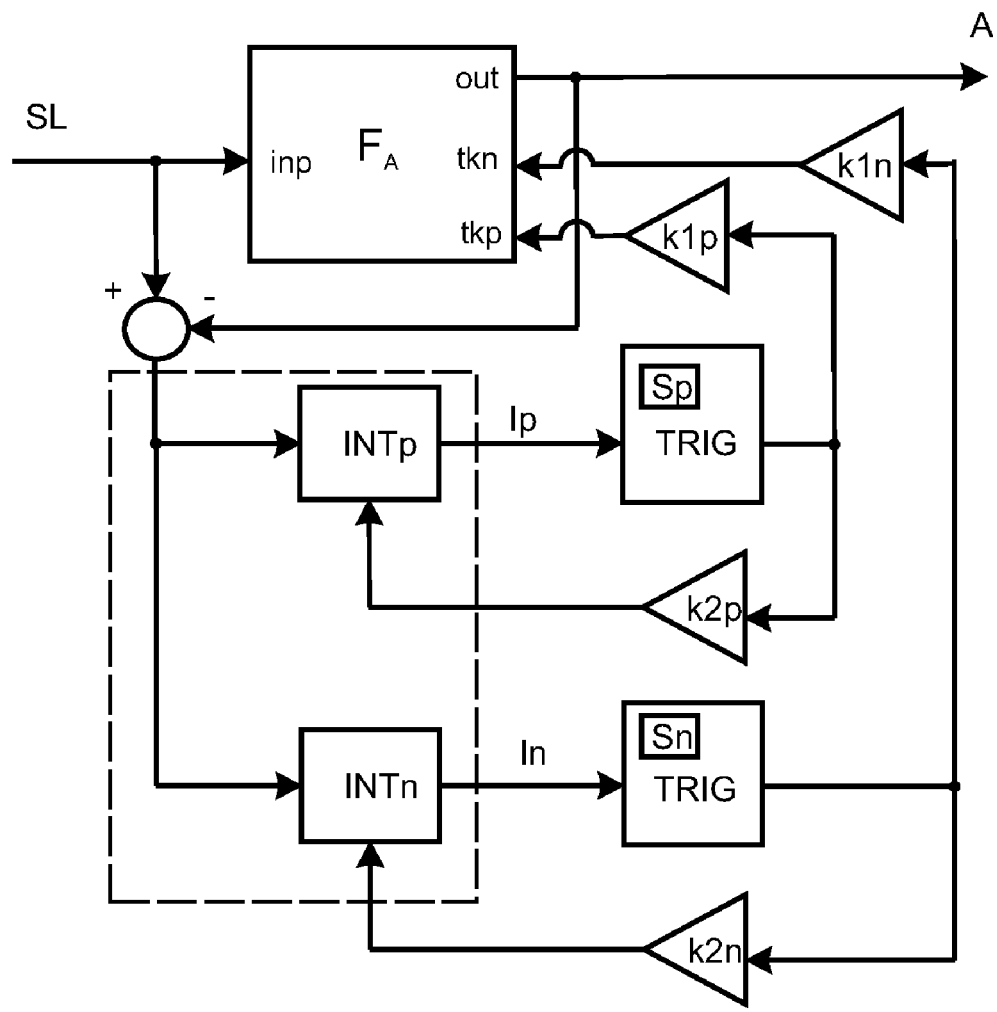
FIG. 5 is a block diagram of a further embodiment of the controller unit, this embodiment differing from FIG. 4 in that the controller unit has separate parts for positive and negative measurement values of the measurement signal SL.

FIG. 5 represents a further example of an embodiment of the controller unit according to FIG. 4, however with the difference that the controller unit has separate parts for positive and negative measurement values of the measurement signal SL and that the positive and negative values are processed separately.

The output of the difference calculator is connected in this case to the input of a positive integrator INTp as well as to the input of a negative integrator INTn in order to deliver the difference signal of the difference calculator to these integrators INTp and INTn. In the integrators INTp and INTn, the difference signal is integrated in order to obtain, respectively, a positive integral value Ip and a negative Integral value In. The integral values Ip and In are preferably calculated with the following reassignment of values:

$$Ip \leftarrow \max(Ip+eps; 0)$$  x.

$$In \leftarrow \max(In-eps; 0)$$  xi.

wherein the function max forms the maximum value of the two input values and eps represents the difference between the values of the measurement signal and the output value A:

$$eps=SL-A$$  xii.

Analogous to the embodiment of FIG. 4, but with a separation of the integral values, Ip is sent to a first trigger TRIG, where Ip is compared to the positive threshold value Sp, and if the threshold value Sp is exceeded a trigger signal is generated. This trigger signal is on the one hand adjusted with the correction parameter k2p and returned to the integrator INTp and on the other hand adjusted with the correction parameter k1p and sent on to the function block $F_A$. In the same way, the integral value In is sent to the trigger TRIG, where In is compared to the negative threshold value Sn, and if the threshold value Sn is exceeded a trigger signal is generated. Analogous to the above description, the trigger signal is on the one hand adjusted with the correction parameter k2n and returned to the integrator INTn and on the other hand adjusted with the correction parameter k1n and sent on to the function block $F_A$.

To receive the signals that have been adjusted with the correction parameters k1p and k1n, the function block $F_A$ has two input terminals tkp and tkn which are connected to the operational amplifiers corresponding, respectively, to the correction parameter k1p and k1n. A signal at the input terminal tkp causes a shift of the capture range in one direction, for example in the direction of positive measurement values, while a signal at the input terminal tkn causes a shift of the capture range in the opposite direction. In this embodiment, the common output value A* and the capture range DSL as well as the positive integral value Ip or the negative integral value In are now updated according to the following assignments:

$$Ip>Sp: A=A+k1p; Ip=Ip-k2p \qquad \text{xiii.}$$

$$In>Sn: A=A-k1n; In=Ip-k2n \qquad \text{xiv.}$$

The correction parameters k1p and k1n can be chosen different or of equal magnitude. Likewise, the correction parameters k2p and k2n can be different or equal.

Figure 6:
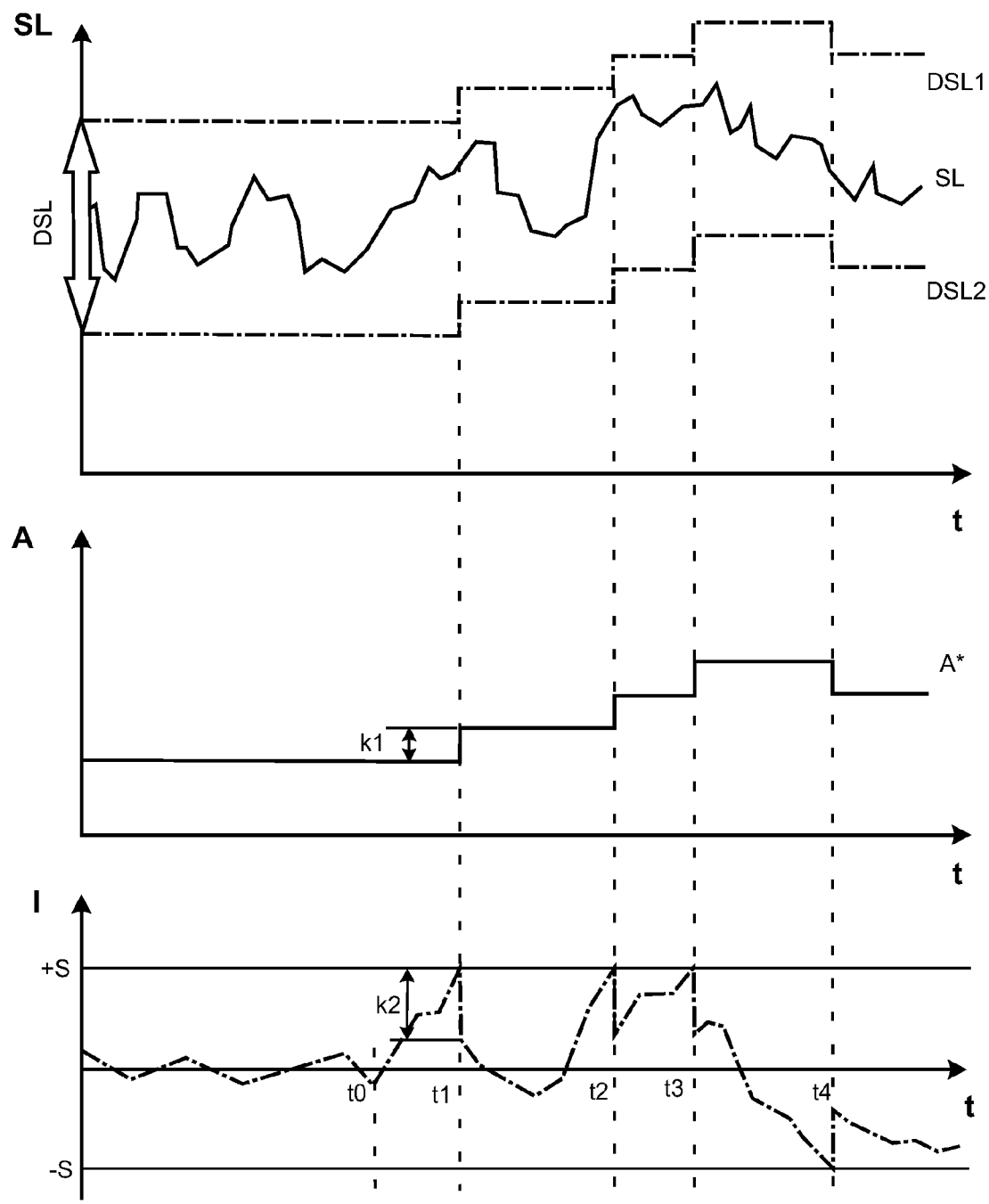
FIG. 6 shows related time profiles of the measurement signal SL with the boundaries of the capture range DSL, the common output value A* and the integral value I of the integrator INT.

FIG. 6 represents a simplified example for the time profiles of the measurement signal SL, the capture range DSL, the common output value A*, and the integral value I during an observation time period t. Initially up to a time t0 the measurement signal SL is largely constant in its basic pattern, with short-term disturbances or fluctuations superimposed on the measurement signal SL. The capture range DSL, more specifically its first boundary DSL1 and its second boundary DSL2 are, however, chosen wide enough that the disturbances are not exceeding the capture range DSL. Accordingly, the result is a stable indication of the common output value A*.

Shortly before the time t1, the measurement signal SL increases noticeably, for example due to a load change. With this increase, the integral value I also changes upward, as the capture range DSL is now no longer symmetric relative to the measurement signal SL, so that the positive signal inputs of the measurement signal SL predominate.

At the time t1, the integral value I exceeds the threshold value S, so that in accordance with FIG. 4 the trigger TRIG releases a trigger signal which shifts the capture range DSL by the amount of the correction parameter k1 in the direction of the increased measurement signal SL and reduces the integral value I by the correction parameter k2. At the time t1, the capture range DSL as well as the evaluation of the measurement signal SL are adjusted in essence simultaneously.

An analogous adjustment as at the time t1 repeats itself at the times t2 and t3. However, at the time t4 the integral value crosses a negative threshold value, so that the correction parameters k1 and k2 change their sign. Accordingly, the capture range DSL is shifted in this case by the amount of the correction parameter k1 in the direction of negative values of the measurement signal SL, and the integral value I is increased by the correction parameter k2.

The amounts of the positive threshold value and the negative threshold value can be equal, but they can also be different. Furthermore, the correction parameters k1 and k2 can be different for positive and negative corrections.

The threshold value S is selected preferably as a function of the required response time $t_a$ for a jump of the indication by a step $A_S$ during the time interval $t_S$ of a step in accordance with the following formula:

$$S=A_s \times t_a/t_s. \qquad \text{xv.}$$

Further, the correction parameters k1 and k2 can be determined with the following formulae:

$$k1=DSL/n \qquad \text{xvi.}$$

$$k2=S/n, \qquad \text{xvii.}$$

wherein n is an integer number representing the desired number of steps.

What is claimed is:

1. A method for processing a signal in an electronic force-measuring device having a measurement transducer that generates a measurement signal corresponding to a force acting on the measurement transducer, comprising the steps of:
   passing the generated measurement signal to a display function, directly or by way of a pre-processing stage;
   assigning, in the display function, an output value to the generated measurement signal, where the display function has an input range comprising a capture range and the assigned output value is a common output value when the generated measurement signal lies within the capture range;
   controlling the position of the capture range, comprising the substeps of:
     determining a difference between the generated measurement signal and the assigned output value;
     integrating the determined differences over time to obtain an integral value based on the incremental determined differences; and
     using the integral value to control, in the display function, the position of the capture range; and
   passing the assigned output value from the display function to at least one of: a display and a unit for further processing.

2. The method of claim 1, wherein:
   the common output value is predefined, based upon at least one of:
     a predefined starting value; and
     a time profile of the generated measurement signal during an earlier time interval.

3. The method of claim 1, wherein:
   the capture range is delimited against the input range by first and second boundary values, with an interval between the respective boundaries kept substantially constant as an element of the control of the capture range.

4. The method of claim 1, wherein:
   the capture range includes a characteristic value, in particular a center-point value of the capture range, which characterizes the position of the capture range and which is controlled dependent on the generated measurement signal.

5. The method of claim 1, wherein:
   the size of the capture range is controlled in at least one of following ways:
     the capture range is wider than the expected fluctuation of the generated measurement signal;
     the capture range is wider than twice the variance of the generated measurement signal; and
     the capture range is wider than the resolution of the display or wider than the accuracy of the further processing unit, whichever is appropriate.

6. The method of claim 1, wherein:
in the assigning step, the control of the capture range is done in a stepwise manner.

7. The method of claim 6, wherein:
the stepwise manner uses a constant step size that corresponds to a first correction parameter.

8. The method of claim 1, further comprising the steps of:
comparing the generated measurement signal to a threshold value; and
depending upon the result of the comparing step, triggering an action to set the position of the capture range.

9. The method of claim 1, wherein:
the step of controlling the capture range position is achieved in a stepwise mode, using steps of constant size according to a second correction parameter that corresponds to position changes of the capture range.

10. The method of claim 1, wherein:
the integral value is changed so that the amount of the changed integral value is greater than zero.

11. The method of claim 1, wherein:
the control of the capture range position concurs substantially with the adjusting of the integral value.

12. The method of claim 1, wherein:
in the integrating substep, a positive integral value is generated by adding the determined differences over time and a negative integral value is generated by subtracting the determined difference; and
in the controlling step, the respective integral values are used to move the position of the capture range in opposite directions according to the integral values.

13. An arrangement for processing a signal in an electronic force-measuring device having a measurement transducer that generates a measurement signal corresponding to a force acting on the measurement transducer, the arrangement comprising: a display-processing unit having an input and an output, the input connected, either directly or by way of a pre-processing unit, to the measurement transducer, thereby receiving the generated measurement signal;
a display function, in the display processing unit, to generate an output value to each generated measurement signal, the display function having an input range that contains a capture range, the position of which, in the input range, is controlled depending on the generated measurement signal, the display function assigning a common output value to all values of the generated measurement signal which lie within the capture range;
a difference calculator, in the display-processing unit, which determines a value of the difference between the generated measurement signal and the output value;
an integrator, also in the display-processing unit, which integrates the calculated difference value into an integral value that is used to control of the position of the capture range; and
at least one of: an indicator unit and a further processing unit, in selective communication with the display-processing unit output.

14. The arrangement of claim 13, further comprising:
a trigger, in the display-processing unit, that compares the generated measurement signal to a predefined value and, depending on the result of the comparison, resets the position of the capture range.

15. An electronic force measuring device, comprising:
a measurement transducer that generates a measurement signal corresponding to a force acting thereon; and
a signal-processing arrangement of claim 13, communicated to the measurement transducer to receive the generated measurement signal.

16. A program for calculating an output value according to the method of claim 1, operationally installed in either a display-processing unit or an arithmetic unit of the electronic force-measuring device.

* * * * *